United States Patent
Tavildar et al.

(10) Patent No.: US 9,584,291 B2
(45) Date of Patent: Feb. 28, 2017

(54) CONTROL SIGNALING FOR ENABLING TWO-HOP ORTHOGONALIZATION FOR DEVICE-TO-DEVICE BROADCASTS

(71) Applicant: QUALCOMM Incorporated, San Diego, CA (US)

(72) Inventors: Saurabha Rangrao Tavildar, Jersey City, NJ (US); Bilal Sadiq, Basking Ridge, NJ (US); Shreeshankar Ravishankar Bodas, Belle Mead, NJ (US); Qiao Li, Hillsborough, NJ (US); Beibei Wang, Bridgewater, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 73 days.

(21) Appl. No.: 14/337,901

(22) Filed: Jul. 22, 2014

(65) Prior Publication Data

US 2015/0085765 A1    Mar. 26, 2015

Related U.S. Application Data

(60) Provisional application No. 61/881,900, filed on Sep. 24, 2013.

(51) Int. Cl.
*H04L 5/00* (2006.01)
*H04W 72/02* (2009.01)
(Continued)

(52) U.S. Cl.
CPC .......... *H04L 5/0073* (2013.01); *H04L 5/0033* (2013.01); *H04L 5/0044* (2013.01);
(Continued)

(58) Field of Classification Search
CPC ... H04L 5/0073; H04L 5/0033; H04L 5/0044; H04L 5/0094; H04L 27/0006; H04L 5/0007; H04W 72/02; H04W 72/005
See application file for complete search history.

(56) References Cited

U.S. PATENT DOCUMENTS

2011/0032897 A1* 2/2011 Ihm ................. H04L 1/1854
370/329
2011/0317569 A1* 12/2011 Kneckt ............. H04W 74/0833
370/252

(Continued)

OTHER PUBLICATIONS

ETRI: "Unicast, Groupcast/broadcast, and Relay for Public Safety D2D Communications", 3GPP Draft; R1-133181, 3rd Generation Partnership Project (3GPP), Mobile Competence Centre ; 650, Route Des Lucioles ; F-06921 Sophia-Antipolis Cedex; France, vol. RAN WG1, no. Barcelona, Spain; Aug. 19, 2003-Aug. 23, 2013, XP050716390, Retrieved from the Internet: URL:http://www.3gpp.org/ftp/tsg ran/WG1_RL1/TSGR1 74/Docs/, Aug. 10, 2013 (Aug. 10, 2013), p. 5-p. 7.

(Continued)

*Primary Examiner* — Jae Y Lee
(74) *Attorney, Agent, or Firm* — Arent Fox LLP

(57) ABSTRACT

A method, an apparatus, and a computer program product for wireless communication are provided. The apparatus receives one or more D2D broadcasts in a set of subchannels of a channel. In addition, the apparatus broadcasts in at least one subchannel of the channel information indicating a subset of the set of subchannels. The one or more D2D broadcasts may include a first set of broadcasts that includes control information and a second set of broadcasts that includes data traffic. The broadcasted information may be control information. The apparatus may determine a signal strength of each of the one or more D2D broadcasts received in the set of subchannels. The broadcasted information may further include the determined signal strength for each subchannel in the subset of the set of subchannels.

30 Claims, 10 Drawing Sheets

(51) Int. Cl.
*H04W 72/00* (2009.01)
*H04L 27/00* (2006.01)

(52) U.S. Cl.
CPC .......... *H04L 5/0094* (2013.01); *H04W 72/02* (2013.01); *H04L 5/0007* (2013.01); *H04L 27/0006* (2013.01); *H04W 72/005* (2013.01)

(56) References Cited

U.S. PATENT DOCUMENTS

| | | | |
|---|---|---|---|
| 2012/0201158 A1 | 8/2012 | Geirhofer et al. | |
| 2012/0250636 A1* | 10/2012 | Wang .................... | H04W 72/08 370/329 |
| 2014/0301228 A1* | 10/2014 | Kwak .................... | H04W 8/005 370/252 |
| 2014/0307642 A1* | 10/2014 | Wanstedt ............ | H04W 76/023 370/329 |
| 2015/0016358 A1* | 1/2015 | Yie et al. ............ | H04W 76/023 370/329 |

OTHER PUBLICATIONS

International Search Report and Written Opinion—PCT/US2014/056617—ISA/EPO—Dec. 9, 2014.

* cited by examiner

CONTROL SIGNALING FOR ENABLING TWO-HOP ORTHOGONALIZATION FOR DEVICE-TO-DEVICE BROADCASTS

CROSS-REFERENCE TO RELATED APPLICATION(S)

This application claims the benefit of U.S. Provisional Application Ser. No. 61/881,900, entitled "CONTROL SIGNALING FOR ENABLING TWO-HOP ORTHOGONALIZATION FOR DEVICE-TO-DEVICE BROADCASTS" and filed on Sep. 24, 2013, which is expressly incorporated by reference herein in its entirety.

BACKGROUND

Field

The present disclosure relates generally to communication systems, and more particularly, to control signaling for enabling two-hop orthogonalization for device-to-device (D2D) broadcast communication.

Background

Wireless devices may select D2D broadcast resources and send D2D broadcast communication on the selected D2D broadcast resources. Methods and apparatuses are needed for reducing interference on the D2D broadcast resources.

SUMMARY

In an aspect of the disclosure, a method, a computer program product, and an apparatus are provided. The apparatus receives one or more D2D broadcasts in a set of subchannels of a channel, and broadcasts in at least one subchannel of the channel information indicating a subset of the set of subchannels. The one or more D2D broadcasts may include a first set of broadcasts that includes control information and a second set of broadcasts that includes data traffic. The broadcasted information may be control information. The apparatus may determine a signal strength of each of the one or more D2D broadcasts received in the set of subchannels. The broadcasted information may further include the determined signal strength for each subchannel in the subset of the set of subchannels.

DETAILED DESCRIPTION

Figure 1:
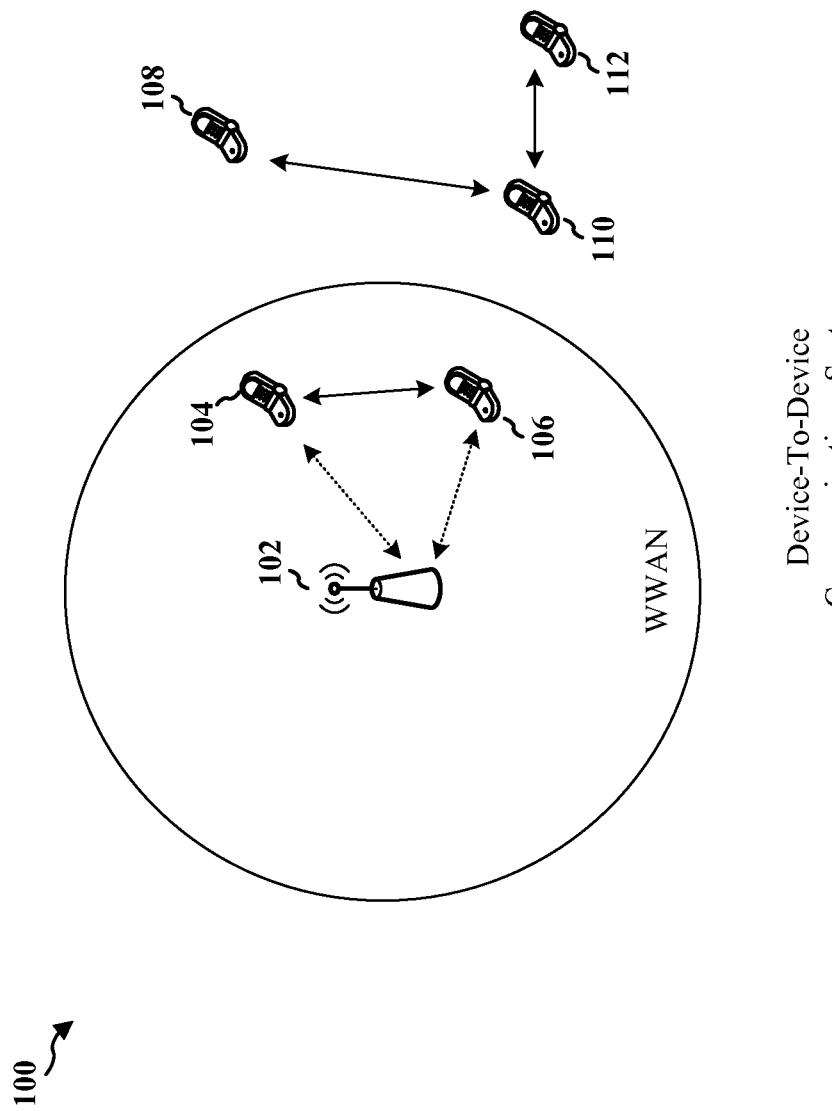
FIG. 1 is a diagram of a D2D communications system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatuses and methods. These apparatuses and methods will be described in the following detailed description and may be illustrated in the accompanying drawings by various blocks, modules, components, circuits, steps, processes, algorithms, elements, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The one or more processors may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), compact disk (CD) ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram 100 of a D2D communications system. The D2D (also referred to as peer-to-peer (P2P)) communications system includes a plurality of wireless devices 104, 106, 108, 110, 112. The D2D communications system may overlap with a cellular communications system, such as for example, a wireless wide area network (WWAN). Some of the wireless devices 104, 106, 108, 110, 112 may communicate together in D2D communication using the DL/UL WWAN spectrum, some may communicate with the base station 102, and some may do both. For example, as shown in FIG. 1, the wireless device 110 is in D2D broadcast communication with the wireless devices 108, 112 and the wireless devices 104, 106 are in D2D communication. The wireless devices 104, 106 may also communicate with the base station 102.

The base station 102 may also be referred to as a Node B, an evolved Node B (eNB), an access point, a base transceiver station, a radio base station, a radio transceiver, a transceiver function, a basic service set (BSS), an extended service set (ESS), or some other suitable terminology. Examples of wireless devices include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The wireless device may also be referred to by those skilled in the art as a user equipment (UE), mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The exemplary methods and apparatuses discussed infra are applicable to any of a variety of wireless D2D communications systems, such as for example, a wireless D2D communication system based on FlashLinQ, WiMedia, Bluetooth, ZigBee, Wi-Fi based on the IEEE 802.11 standard, or Long Term Evolution (LTE). However, one of ordinary skill in the art would understand that the exemplary methods and apparatuses are applicable more generally to a variety of other wireless D2D communication systems.

UEs may select D2D broadcast resources and send D2D broadcast communication on the selected D2D broadcast resources. Methods and apparatuses of control signaling for enabling two-hop orthogonalization for D2D broadcasts are provided infra. The two-hop orthogonalization for D2D broadcasts reduces interference on D2D broadcast resources utilized for the D2D broadcasts.

Figure 2:
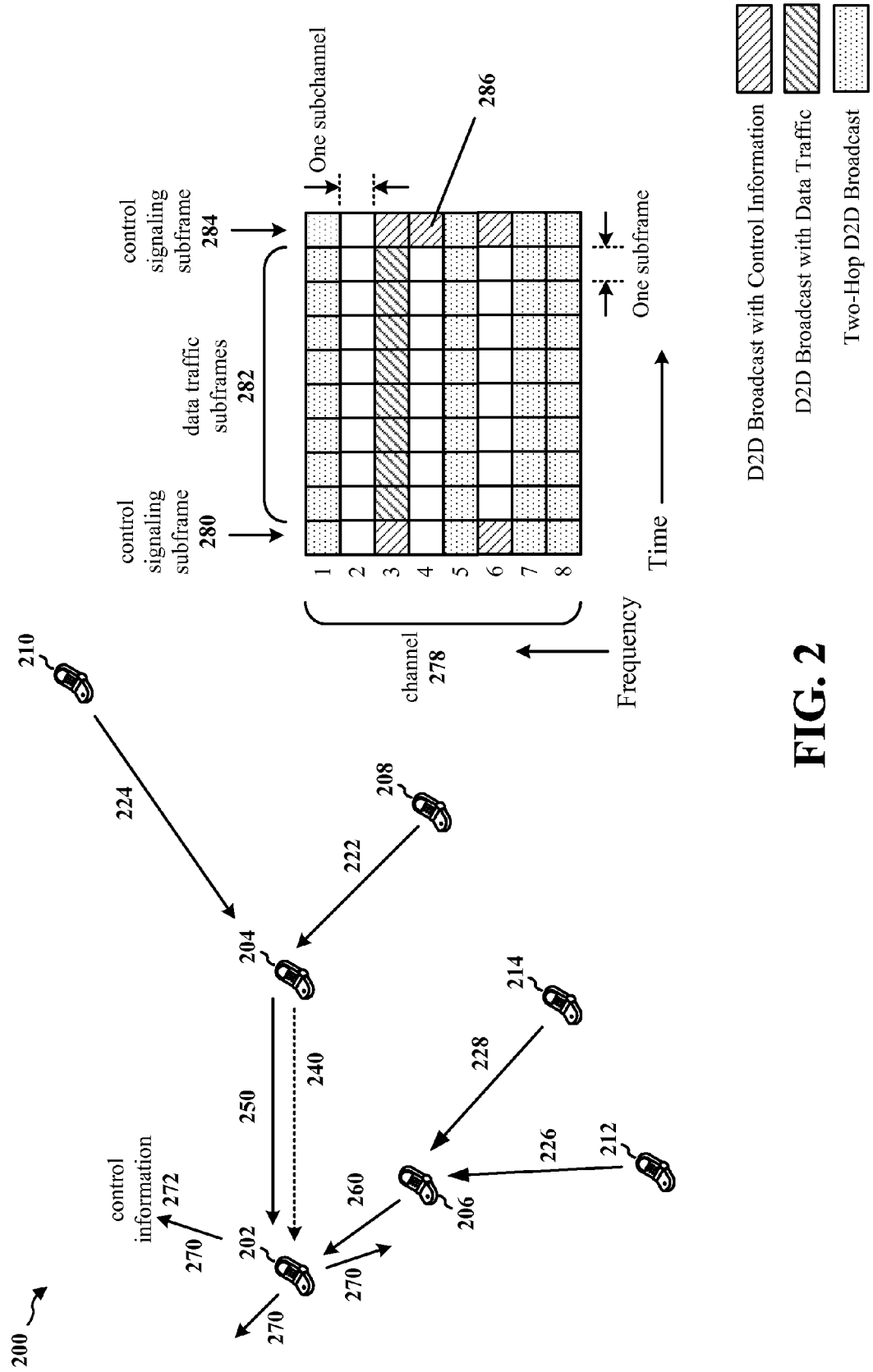
FIG. 2 is a diagram illustrating an exemplary method of control signaling for enabling two-hop orthogonalization for D2D broadcasts.

FIG. 2 is a diagram 200 illustrating a method of control signaling for enabling two-hop orthogonalization for D2D broadcasts. As shown in FIG. 2, the UE 202 receives D2D broadcasts 240, 250 from the UE 204 and D2D broadcast 260 from the UE 206. The D2D broadcast 240 includes data traffic (e.g., voice, video, and/or other data) and the D2D broadcasts 250, 260 include control information (also referred to as control signaling). Some of the D2D broadcasts may include both data traffic and control information. The UE 202 receives the D2D broadcasts 240, 250, 260 in a set of subchannels 3, 6 of a channel 278. Specifically, the UE 202 receives the D2D broadcast 250 in the subchannel 3 within the control signaling subframe 280, the D2D broadcast 260 in the subchannel 6 within the control signaling subframe 280, and the D2D broadcast 240 in the subchannel 3 within the data traffic subframes 282. Generally, a bandwidth of the channel 278 may be X MHz and each subchannel in the channel 278 may span 180 kHz. In one example, the channel 278 has a bandwidth of 10 MHz and includes at least 50 subchannels. After the UE 202 receives the D2D broadcasts, the UE 202 transmits control information 272 in the broadcast 270 in at least one subchannel of the channel 278 indicating/reporting a subset of the set of subchannels on which the D2D broadcasts 240, 250, 260 were received. For example, the UE 202 may broadcast the control information 272 in the resource 286 in the subchannel 4 of the control signaling subframe 284. The control information 272 may include information indicating/reporting the subchannel 3 and/or the subchannel 6 on which the UE 202 received the D2D broadcasts 240, 250, 260.

In one configuration, the UE 202 may construct the control information 272 to include information reporting all of the subchannels on which the UE 202 received D2D broadcasts. For example, the UE 202 may construct the control information 272 to include information reporting both the subchannel 3 and the subchannel 6. In another configuration, the UE 202 may limit the number of subchannels on which to report, and may report the subchannels with the highest signal strength. In this configuration, the UE 202 determines a signal strength of each of the D2D broadcasts 240, 250, 260 received in the set of subchannels 3, 6. The UE 202 determines a maximum number $N_{max}$ of subchannels to report, and ranks each subchannel in the set of subchannels 3, 6 by the determined signal strength. The UE 202 may report the top N ranked subchannels with $N \leq N_{max}$. For example, assume $N=N_{max}=1$. The UE 202 may determine that the broadcast 260 received in the subchannel 6 has a higher signal strength than the broadcasts 240, 250 received in the subchannel 3. The UE 202 may then report the subchannel 6 in the control information 272, and refrain from reporting the subchannel 3 in the control information 272. In addition to reporting one or more of the subchannels on which the UE 202 receives D2D broadcasts, the UE 202 may report the determined signal strength for each of the subchannels that the UE 202 reports.

The UEs 204, 206 may also broadcast control information reporting subchannels on which the UEs receive D2D broadcasts and the signal strengths of the received D2D broadcasts. The UE 204 receives a D2D broadcast 222 from the UE 208 and a D2D broadcast 224 from the UE 210. The UE 204 determines the subchannels on which the D2D broadcasts 222, 224 are received and a signal strength of each of the received D2D broadcasts 222, 224. For example, the UE 204 may determine that the D2D broadcasts 222, 224 are received on subchannels 1, 5. The UE 204 constructs control information reporting one or more of the subchannels 1, 5 and a corresponding signal strength of D2D broadcasts received on the reported subchannels. Assume the UE 204 reports both the subchannels 1, 5 and the signal strengths of the D2D broadcasts 222, 224 received on the subchannels 1, 5. The UE 204 then transmits the control information in the D2D broadcast 250. The UE 206 receives a D2D broadcast 226 from the UE 212 and a D2D broadcast 228 from the UE 214. The UE 206 determines the subchannels on which the D2D broadcasts 226, 228 are received and a signal strength of each of the received D2D broadcasts 226, 228. For example, the UE 206 may determine that the D2D broadcasts 226, 228 are received on subchannels 7, 8. The UE 206 constructs control information reporting one or more of the subchannels 7, 8 and a corresponding signal strength of D2D broadcasts received on the reported subchannels. Assume the UE 206 reports both the subchannels 7, 8 and the signal strengths of the D2D broadcasts 226, 228 received on the subchannels 7, 8. The UE 206 then transmits the control information in the D2D broadcast 260.

Based on control information reported in the received D2D broadcasts 250, 260, the UE 202 determines that the UEs 204, 206 received D2D broadcasts on the subchannels 1, 5, 7, 8 and the signal strengths of the received D2D broadcasts. Accordingly, the UE 202 determines that its one-hop neighbors are utilizing subchannels 3, 6 and that its two-hop neighbors are utilizing subchannels 1, 5, 7, 8. The UE 202 may then determine that the subchannels 2, 4 are unutilized by its one-hop and two-hop neighbors. The UE 202 may select one or more subchannels from the subchannels 2, 4 for transmitting the control information 272 in the broadcast 270. The one or more selected subchannels may be contiguous. For example, as shown in FIG. 2, the UE 202 selects the subchannel 4 for transmitting the control information 272 (resource 286 of the control signaling subframe 284). The UE 202 may select the subchannel for the broadcast 270 randomly. Accordingly, the probability that the UE 202 selects subchannel 2 is equal to the probability that the UE 202 selects subchannel 4. If the UE 202 is using two subchannels for transmitting the control information 272, the UE 202 may select both the subchannels 2, 4 for transmitting the control information 272.

If the UE 202 is using x subchannels for the broadcast 270, but only y subchannels are unutilized, where y<x (e.g., all subchannels are being utilized (y=0), only one channel is unutilized (y=1) and the UE 202 is utilizing two or more subchannels (x≥2), etc.), the UE 202 may select y unutilized subchannels for the broadcast 270, and may select x−y utilized subchannels for the broadcast 270 based on comparisons of the determined signal strengths to thresholds. The selected x subchannels may be contiguous with each other. Specifically, the UE 202 may determine a first subset of subchannels utilized by one-hop neighbors with a signal strength less than a first threshold and a second subset of subchannels utilized by two-hop neighbors with a signal strength less than a second threshold. The second threshold may be greater than the first threshold. The first subset of subchannels is determined by comparing the first threshold to signal strengths of D2D broadcasts received by the UE 202 from its one-hop neighbors. The second subset of subchannels is determined by comparing the second threshold to signal strengths of D2D broadcasts received by the one-hop neighbors from their one-hop neighbors (two-hop neighbors for the UE 202). To account for the differences in the comparisons and because the effective signal strength of D2D broadcasts from two-hop neighbors as experienced by the UE 202 would be less than the signal strengths used for determining the second subset of subchannels, the second threshold may be adjusted to be greater than the first threshold. After determining the first and second subsets of subchannels, the UE 202 may select one or more subchannels for the broadcast 270 from the first and second subsets of subchannels. The UE 202 may select the one or more subchannels for the broadcast 270 randomly from the first and second subsets of subchannels. For example, assume that the UE 206 reports receiving a D2D broadcast on subchannel 7 with a signal strength $S_1$ (from the UE 212) and a D2D broadcast on subchannel 8 with a signal strength $S_1$ (from the UE 214), and the UE 204 reports receiving a D2D broadcast on the subchannels 1, 2 with a signal strength $S_1$ (from the UE 208) and on the subchannels 4, 5 with a signal strength $S_2$ (from the UE 210), where $S_2<S_1$. Accordingly, each of the subchannels are utilized (i.e., y=0). The UE 202 may compare the signal strengths of the D2D broadcasts 240, 250, 260 to a first threshold to determine a first subset of subchannels, and compare the signal strengths of the D2D broadcasts 222, 224, 226, 228 to a second threshold to determine a second subset of subchannels. The UE 202 may determine that there are no subchannels of the subchannels 3, 6 with a corresponding signal strength less than the first threshold and that only subchannels 4, 5 of the subchannels 1, 2, 4, 5, 7, 8 have a corresponding signal strength less than the second threshold. Accordingly, the UE 202 may select one or more of the subchannels from the subchannels 4, 5 for sending the broadcast 270. The UE 202 may select the one or more subchannels randomly from the subchannels 4, 5.

UEs may utilize one-hop neighborhood information when selecting subchannels for D2D broadcasts in order to reduce interference to other UEs. As described supra, UEs also exchange two-hop neighborhood information in order to reduce further the interference with respect to D2D broadcasts. When selecting a subchannel for a D2D broadcast, a UE may avoid selecting a subchannel utilized in its one-hop and two-hop neighborhoods. When a UE determines to transmit on a utilized subchannel, the UE may select a subchannel utilized by a UE that is sufficiently far away (based on signal strength comparisons) so as not to cause interference to the UE. Interference may be further reduced by dedicating additional resources for the control signaling (also referred to as link budget control signaling). To reduce interference in the control signaling, a target control link budget may be increased by about 10 dB compared to a normal communication link budget. To increase the target control link budget to facilitate interference free reception, a coding rate may be reduced for the control signaling and resources for the control signaling may be over provisioned. Specifically, additional consecutive subframes may be allocated for the control signaling. For example, rather than provisioning one subframe of a set of frames (e.g., 25 frames) for control signaling, two or more consecutive subframes of a set of frames may be provisioned. When more than one consecutive subframe is provisioned, a modulation and coding scheme (MCS) may be reduced/lowered for the control signaling as compared to the MCS used for the data traffic.

Figure 3:
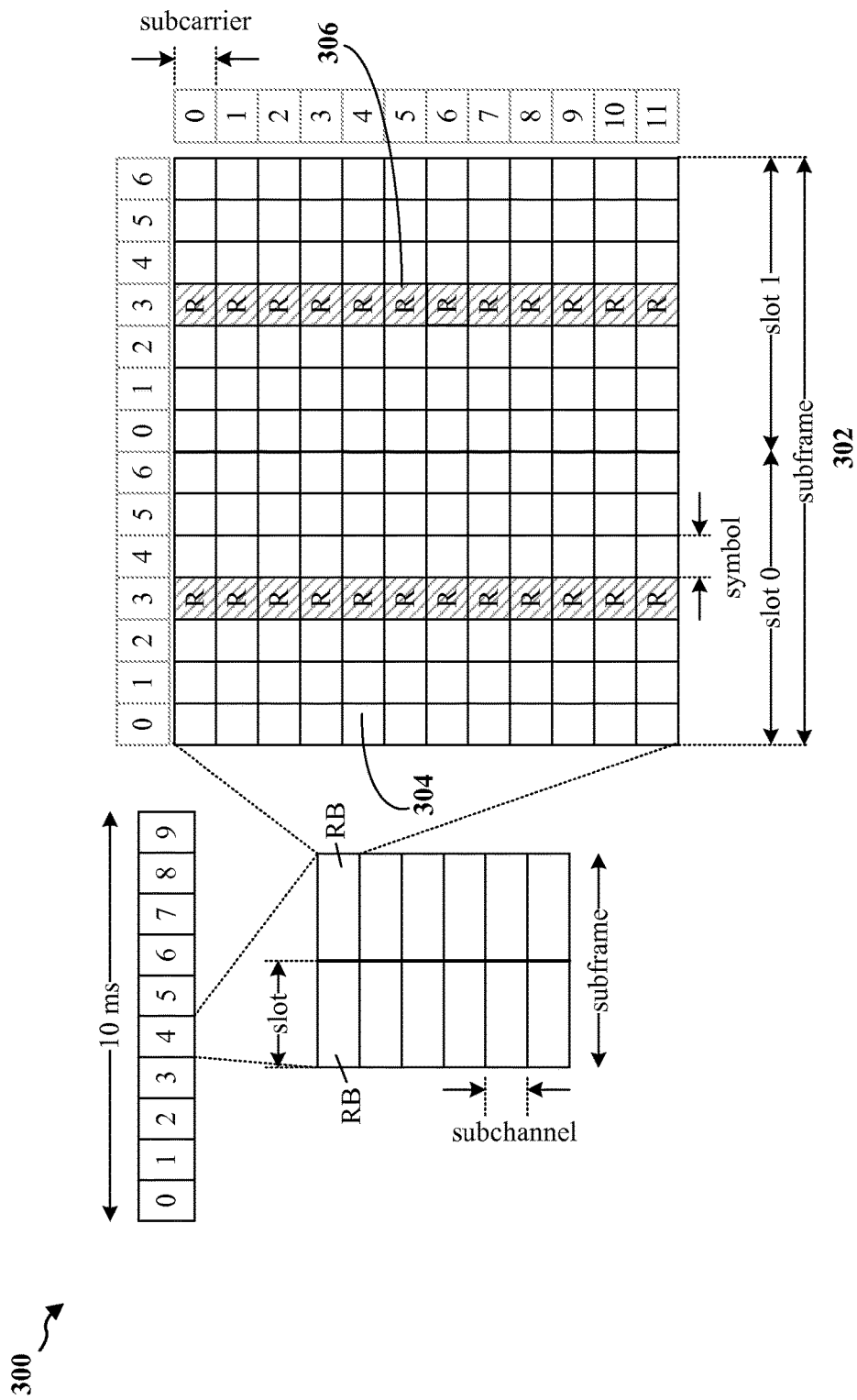
FIG. 3 is a diagram illustrating a subframe structure.

FIG. 3 is a diagram 300 illustrating a subframe structure. A frame (10 ms) may be divided into 10 equally sized subframes 302. Each subframe includes a plurality of subchannels. Each subchannel includes 14 single carrier frequency division multiple access (SC-FDMA) symbols and 12 subcarriers. Each subchannel may span 180 kHz, and thus each subcarrier may span 15 kHz. Each subchannel may include two consecutive time slots. A resource grid may be used to represent two time slots, each time slot including a resource block. The resource grid is divided into multiple resource elements. A resource block contains 12 consecutive subcarriers in the frequency domain and 7 consecutive symbols in the time domain, or 84 resource elements. The resource elements 304 may include data and/or control information. The resource elements 306 may include reference/pilot signals. The number of bits carried by each resource element depends on the MCS.

Figure 4:
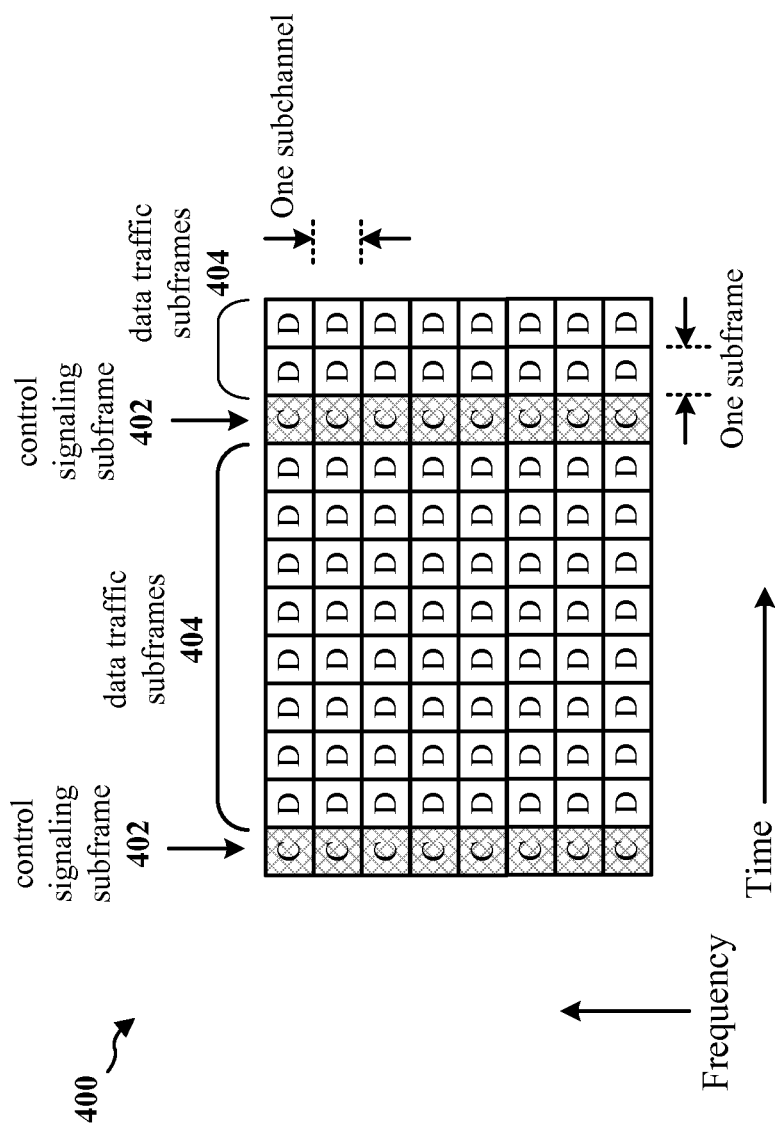
FIG. 4 is a first diagram illustrating a set of resources for D2D broadcasts.

FIG. 4 is a first diagram 400 illustrating a set of resources for D2D broadcasts. As shown in FIG. 4, particular subframes 402 may be dedicated for control signaling and other subframes 404 may be dedicated for data traffic. Each control signaling subframe 402 within a subchannel may be used for transmitting control information in a D2D broadcast. Each data traffic subframe 404 within a subchannel may be used for transmitting data in a D2D broadcast.

Figure 5:
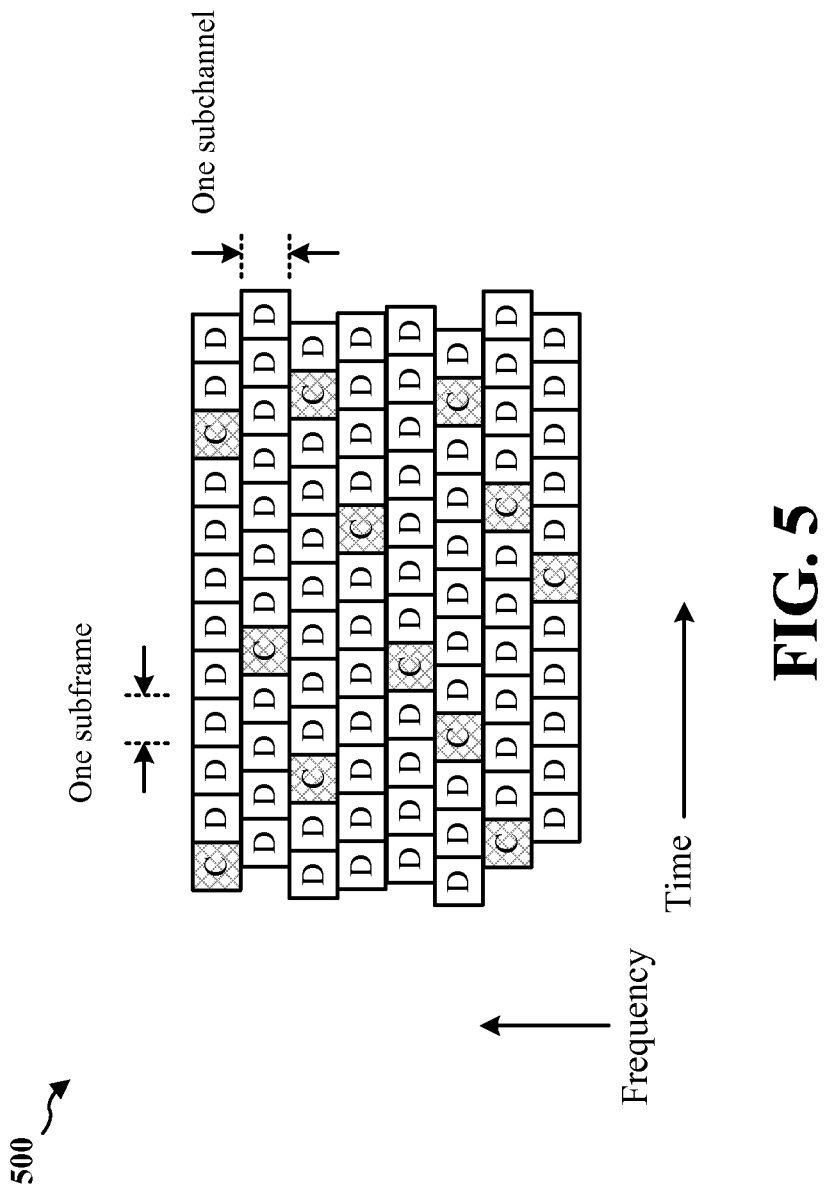
FIG. 5 is a second diagram illustrating a set of resources for D2D broadcasts.

FIG. 5 is a second diagram 500 illustrating an exemplary set of resources for D2D broadcasts. As shown in FIG. 5, subchannels are shifted with respect to each other. When UEs are not synchronized with each other, the subframes of the UEs may not align. Further, as shown in FIG. 5, the subframes in which UEs transmit control information and data traffic within a frame may be different.

Figure 6:
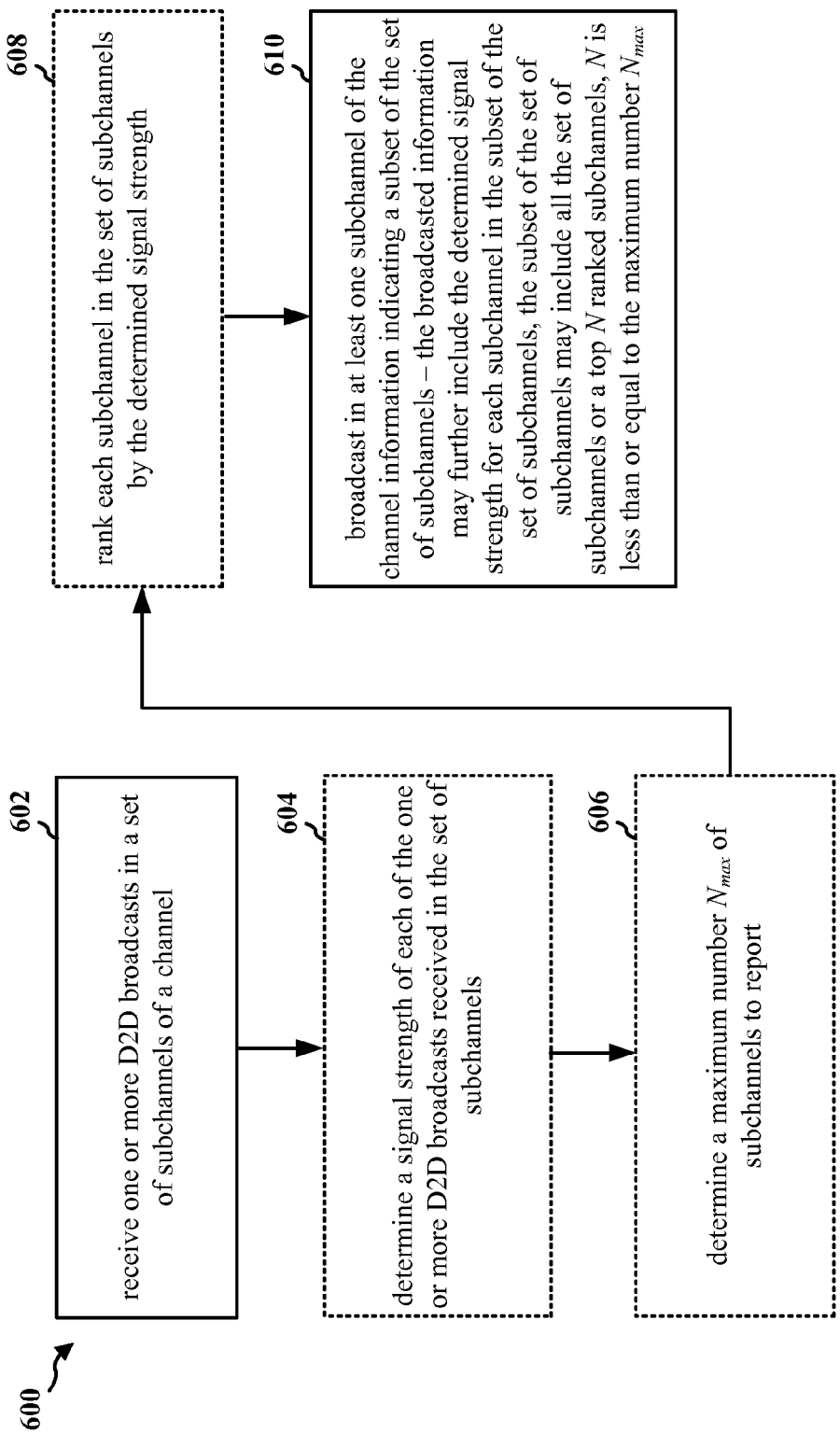
FIG. 6 is a flow chart of a first method of wireless communication.

FIG. 6 is a flow chart 600 of a first method of wireless communication. The method may be performed by a UE, such as the UE 202. As shown in FIG. 6, in step 602, a UE receives one or more D2D broadcasts in a set of subchannels of a channel. The one or more D2D broadcasts may include a first set of broadcasts that includes control information and a second set of broadcasts that includes data traffic. For example, referring to FIG. 2, the UE 202 receives the D2D broadcasts 240, 250, 260 in the set of subchannels 3, 6 of a channel 278. The D2D broadcasts 240, 250, 260 include a first set of broadcasts 250, 260 that includes control information and a second set of broadcasts 240 that includes data traffic. In step 604, the UE may also determine a signal strength of each of the one or more D2D broadcasts received in the set of subchannels. For example, referring to FIG. 2, the UE 202 may determine a signal strength of the D2D broadcast received in the subchannel 3 and a signal strength of the D2D broadcast received in the subchannel 6. The signal strengths may be determined based on the received power of the D2D broadcasts on the subchannels 3, 6. In step 606, the UE may determine a maximum number $N_{max}$ of subchannels to report. The UE may receive information indicating the maximum number $N_{max}$ of subchannels to report, or the maximum number $N_{max}$ of subchannels to report may be preconfigured in the UE. In step 608, the UE may rank each subchannel in the set of subchannels by the determined signal strength. In step 610, the UE broadcasts in at least one subchannel of the channel control information indicating a subset of the set of subchannels. In one configuration, the subset of the set of subchannels includes all of the subchannels in the set of subchannels. In such a configuration, the UE may not perform the steps 606, 608. In another configuration, the subset of the set of subchannels includes less than all of the subchannels in the set of subchannels. In such a configuration, the UE performs the steps 606, 608, and the subset of the set of subchannels may include a top N ranked subchannels (i.e., N subchannels with the highest signal strength), N being less than or equal to the maximum number $N_{max}$. In step 610, the broadcasted control information may further include the determined signal strength for each subchannel in the subset of the set of subchannels.

The broadcast in the at least one subchannel may be concurrent in time with other broadcasts in the channel that include control information, and the broadcast in the at least one subchannel may include one or more resource blocks within n consecutive subframes of a set of frames (e.g., 25 frames). In one configuration, n is equal to one. In another configuration, n is greater than or equal to two. The broadcasts including control information may have a lower MCS than broadcasts including data traffic.

Figure 7:
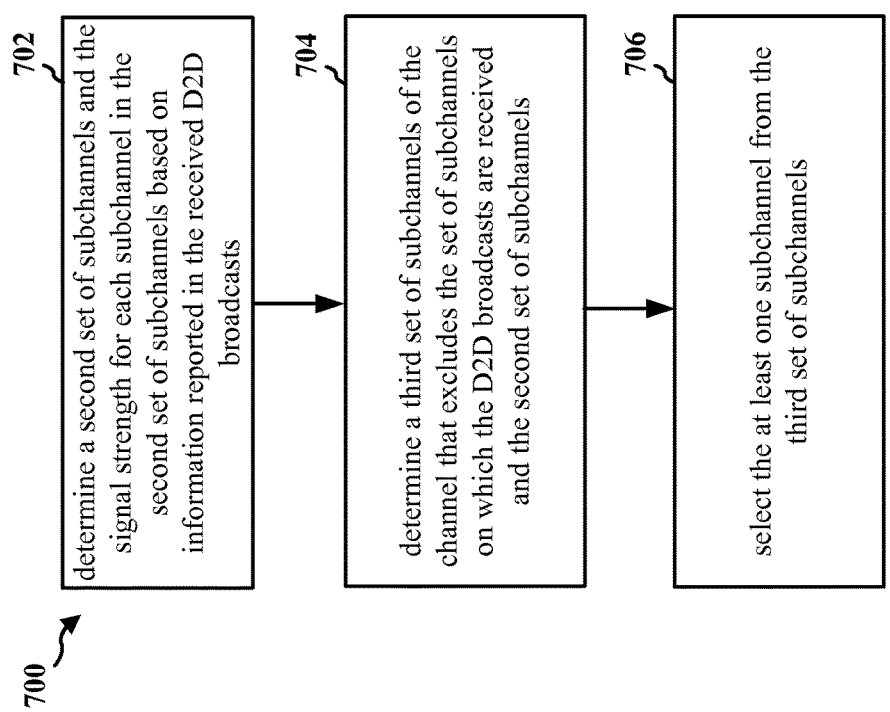
FIG. 7 is a flow chart of a second method of wireless communication.

FIG. 7 is a flow chart 700 of a second method of wireless communication. The method may be performed by a UE, such as the UE 202. As shown in FIG. 7, in step 702, a UE determines a second set of subchannels and the signal strength for each subchannel in the second set of subchannels based on information reported in the received D2D broadcasts. For example, referring to FIG. 2, the UE 202 may determine a second set of subchannels 1, 5, 7, 8 and the signal strength for each subchannel in the second set of subchannels 1, 5, 7, 8 based on information reported in the received D2D broadcasts. In step 704, the UE determines a third set of subchannels of the channel that excludes the set of subchannels on which the D2D broadcasts are received in step 602 and the second set of subchannels. For example, referring to FIG. 2, the UE 202 may determine a third set of subchannels 2, 4 of the channel 278 that excludes the set of subchannels 3, 6 and the second set of subchannels 1, 5, 7, 8. In step 706, the UE selects the at least one subchannel from the third set of subchannels. The selected at least one subchannel may be contiguous. The UE may select the at least one subchannel randomly from the third set of subchannels. For example, referring to FIG. 2, the UE 202 may select the subchannel 4 from the third set of subchannels 2, 4.

Figure 8:
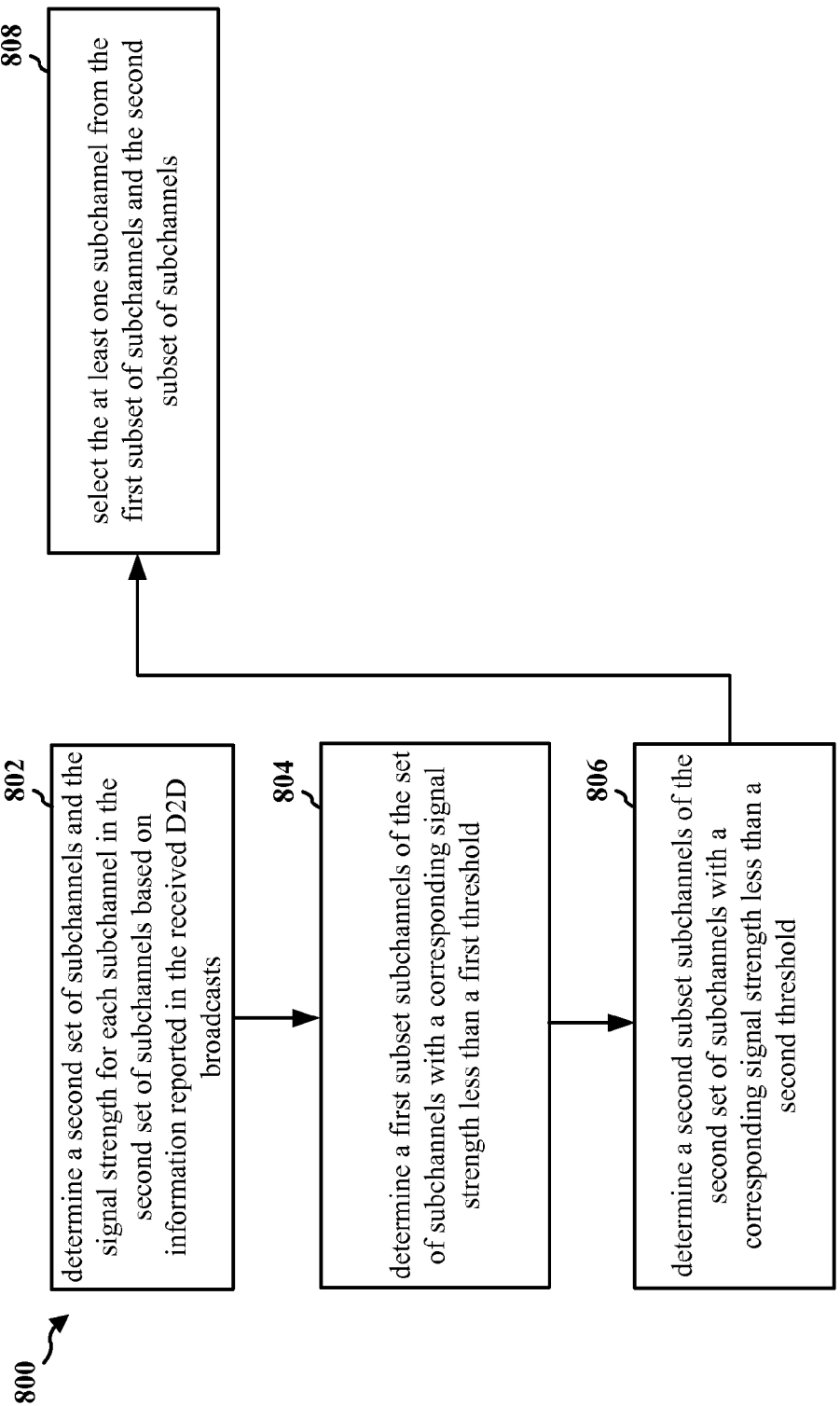
FIG. 8 is a flow chart of a third method of wireless communication.

FIG. 8 is a flow chart 800 of a third method of wireless communication. The method may be performed by a UE, such as the UE 202. As shown in FIG. 8, in step 802, a UE determines a second set of subchannels and the signal strength for each subchannel in the second set of subchannels based on information reported in the received D2D broadcasts. For example, referring to FIG. 2, the UE 202 may determine a second set of subchannels 1, 2, 4, 5, 7, 8 and the signal strength for each subchannel in the second set of subchannels 1, 2, 4, 5, 7, 8 based on information reported in the received D2D broadcasts. In step 804, the UE determines a first subset of subchannels of the set of subchannels with a corresponding signal strength less than a first threshold. For example, referring to FIG. 2, the UE 202 may determine a first subset of subchannels of the set of subchannels 3, 6 with a corresponding signal strength less than a first threshold. The first subset of subchannels may by an empty set (if D2D broadcasts received on the subchannels 3 and 6 each have a signal strength greater than or equal to the first threshold), or may include one or more of the subchannels 3 and 6. In step 806, the UE determines a second subset of subchannels of the second set of subchannels with a corresponding signal strength less than a second threshold. For example, referring to FIG. 2 and the description in relation to FIG. 2, the UE 202 may determine a second subset of subchannels 4, 5 of the second set of subchannels 1, 2, 4, 5, 7, 8 with a corresponding signal strength less than a second threshold. In step 808, the UE selects the at least one subchannel from the first subset of subchannels and the second subset of subchannels. For example, referring to FIG. 2, if the first subset of subchannels is the empty set, the UE 202 may select the at least one subchannel from the second subset of subchannels 4, 5. The UE may select the at least one subchannel randomly from the determined first and second subsets of subchannels. For example, referring to FIG. 2, if the first subset of subchannels is the empty set, the UE 202 may select the at least one subchannel randomly from the second subset of subchannels 4, 5.

Figure 9:
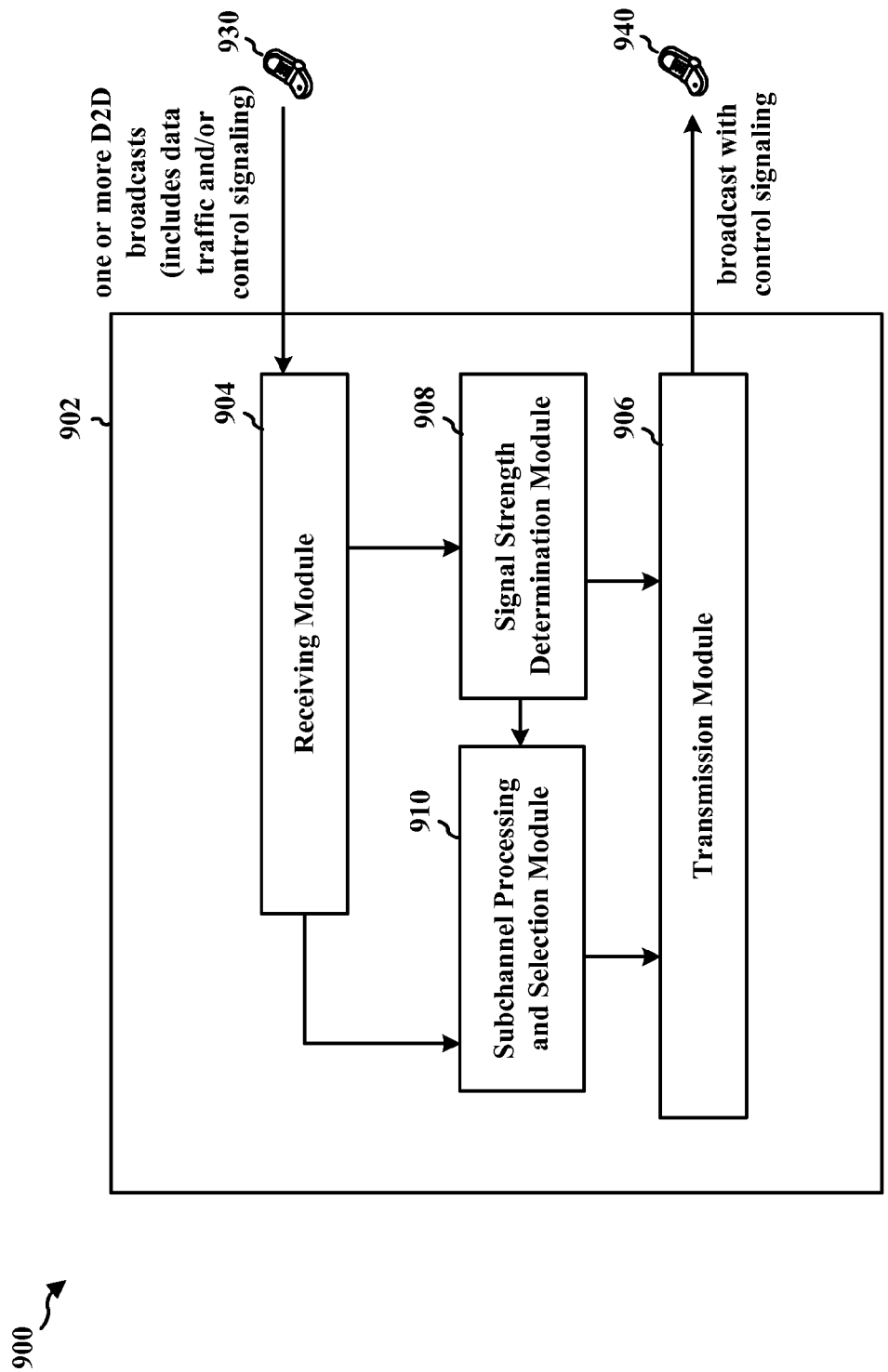
FIG. 9 is a conceptual data flow diagram illustrating the data flow between different modules/means/components in an exemplary apparatus.

FIG. 9 is a conceptual data flow diagram 900 illustrating the data flow between different modules/means/components in an exemplary apparatus 902. The apparatus may include a receiving module 904 that is configured to receive one or more D2D broadcasts in a set of subchannels of a channel from a set of UEs 930. The apparatus may further include a transmission module 906 that is configured to broadcast, in at least one subchannel of the channel to a set of UEs 940, information indicating a subset of the set of subchannels. The one or more D2D broadcasts may include a first set of broadcasts that includes control information and a second set of broadcasts that includes data traffic. The broadcasted information may be control information. The subset of the set of subchannels may include all of the subchannels in the set of subchannels. The apparatus may further include a signal strength determination module 908 that is configured to determine a signal strength of each of the one or more D2D broadcasts received in the set of subchannels. The broadcasted information may further include the determined signal strength for each subchannel in the subset of the set of subchannels. The apparatus may further include a subchannel processing and selection module 910 that is configured to determine a maximum number $N_{max}$ of subchannels to report, and to rank each subchannel in the set of subchannels by the determined signal strength. The subset of the set of subchannels may include a top N ranked subchannels, N being less than or equal to the maximum number $N_{max}$. The subchannel processing and selection module 910 may be further configured to determine a second set of subchannels and the signal strength for each subchannel in the second set of subchannels based on information reported in the received D2D broadcasts, to determine a third set of subchannels of the channel that excludes the set of subchannels and the second set of subchannels, and to select the at least one subchannel from the third set of subchannels. The at least one subchannel may be selected randomly from the third set of subchannels. The subchannel processing and selection module 910 may be further configured to determine a second set of subchannels and the signal strength for each subchannel in the second set of subchannels based on information reported in the received D2D broadcasts, to determine a first subset of subchannels of the set of subchannels with a corresponding signal strength less than a first threshold, to determine a second subset of subchannels of the second set of subchannels with a corresponding signal strength less than a second threshold, and to select the at least one subchannel from the first subset of subchannels and the second subset of subchannels. The at least one subchannel may be selected randomly from the determined first and second subsets of subchannels. The broadcast in the at least one subchannel may be concurrent in time with other broadcasts in the channel that include control information, and the broadcast in the at least one subchannel may include one or more resource blocks within n consecutive subframes of a set of frames. In one configuration, n is equal to one. In another configuration, n is greater than or equal to two. The broadcasts including control information may have a lower MCS than broadcasts including data traffic.

Figure 10:
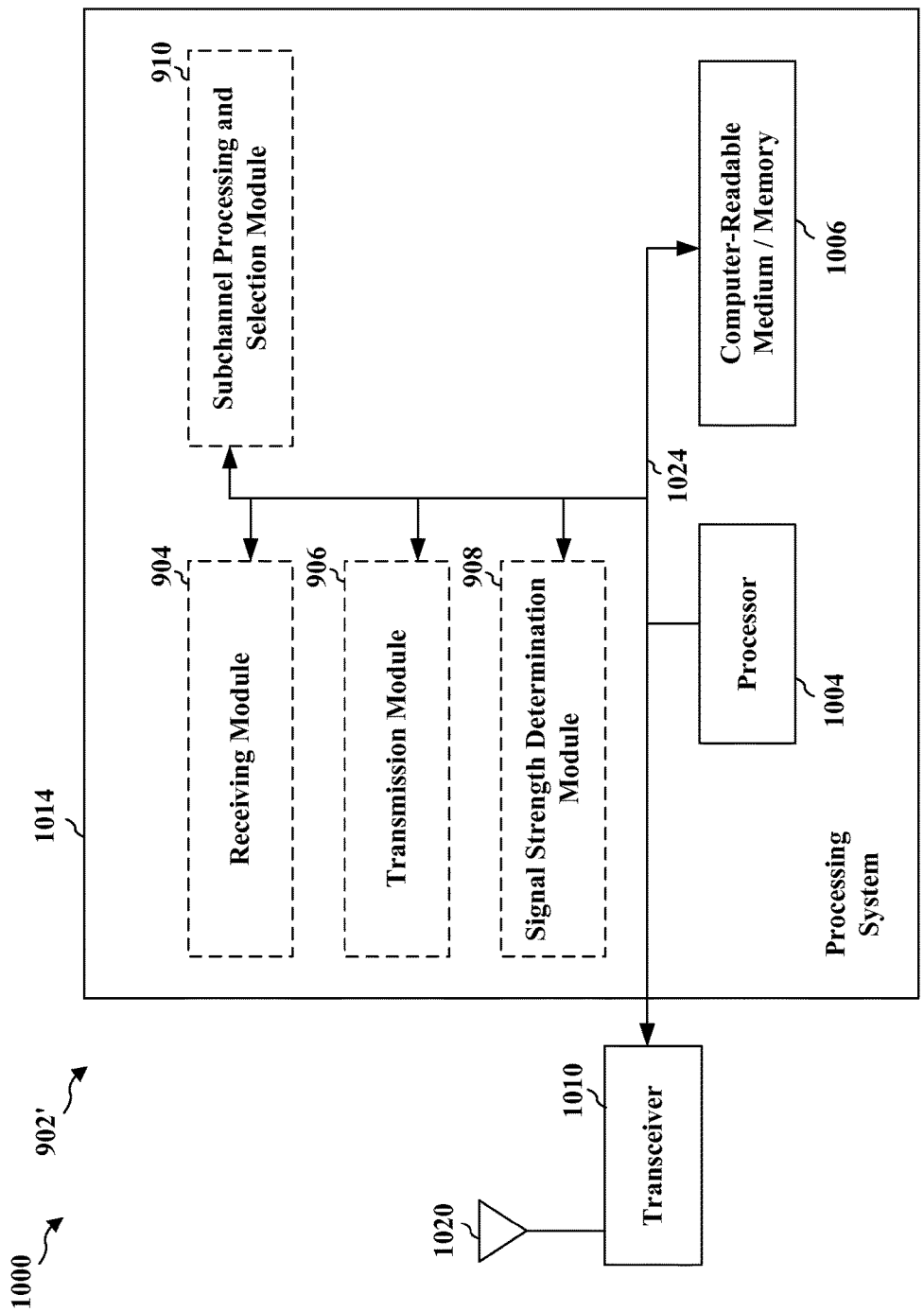
FIG. 10 is a diagram illustrating an example of a hardware implementation for an apparatus employing a processing system.

The apparatus may include additional modules that perform each of the steps of the algorithm in the aforementioned flow charts of FIGS. 6-8. As such, each step in the aforementioned flow charts of FIGS. 6-8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1004, the modules 904, 906, 908, 910, and the computer-readable medium/memory 1006. The bus 1024 may also link various other circuits such as timing sources, peripherals, voltage regulators, and power management circuits, which are well known in the art, and therefore, will not be described any further. The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014. In addition, the transceiver 1010 receives information from the processing system 1014, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system further includes at least one of the modules 904, 906, 908, 910. The modules may be software modules running in the processor 1004, resident/stored in the computer readable medium/memory 1006, one or more hardware modules coupled to the processor 1004, or some combination thereof In one configuration, the apparatus 902/902' for wireless communication includes means for receiving one or more device-to-device (D2D) broadcasts in a set of subchannels of a channel, and means for broadcasting in at least one subchannel of the channel information indicating a subset of the set of subchannels. The apparatus may further include means for determining a signal strength of each of the one or more D2D broadcasts received in the set of subchannels. The means for broadcasting may be configured to broadcast the information with the determined signal strength for each subchannel in the subset of the set of subchannels. The apparatus may further include means for determining a maximum number $N_{max}$ of subchannels to report, and means for ranking each subchannel in the set of subchannels by the determined signal strength. The subset of the set of subchannels may include a top N ranked subchannels, N being less than or equal to the maximum number $N_{max}$. The apparatus may further include means for determining a second set of subchannels and the signal strength for each subchannel in the second set of subchannels based on information reported in the received D2D broadcasts, means for determining a third set of subchannels of the channel that excludes the set of subchannels and the second set of subchannels, and means for selecting the at least one subchannel from the third set of subchannels. The apparatus may further include means for determining a second set of subchannels and the signal strength for each subchannel in the second set of subchannels based on information reported in the received D2D broadcasts, means for determining a first subset of subchannels of the set of subchannels with a corresponding signal strength less than a first threshold, means for determining a second subset of subchannels of the second set of subchannels with a corresponding signal strength less than a second threshold, and means for selecting the at least one subchannel from the first subset of subchannels and the second subset of subchannels. The aforementioned means may be one or more of the aforementioned modules of the apparatus 902 and/or the processing system 1014 of the apparatus 902' configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   receiving one or more device-to-device (D2D) broadcasts in a set of subchannels of a channel; and
   broadcasting in at least one subchannel of the channel information indicating a subset of the set of subchannels on which the one or more D2D broadcasts are received and a respective signal strength associated with each subchannel in the subset of the set of subchannels.

2. The method of claim 1, wherein the one or more D2D broadcasts include a first set of broadcasts that comprises control information and a second set of broadcasts that comprises data traffic, wherein the broadcasted information is control information.

3. The method of claim 1, wherein the subset of the set of subchannels includes all of the subchannels in the set of subchannels.

4. The method of claim 1, further comprising determining the respective signal strength of each of the one or more D2D broadcasts received in the set of subchannels.

5. The method of claim 4, further comprising:
   determining a maximum number $N_{max}$ of subchannels to report; and
   ranking each subchannel in the set of subchannels by the determined signal strength,
   wherein the subset of the set of subchannels includes a top N ranked subchannels, N being less than or equal to the maximum number $N_{max}$.

6. The method of claim 4, further comprising:
   determining a second set of subchannels and the signal strength for each subchannel in the second set of sub channels based on information reported in the received D2D broadcasts;
   determining a third set of subchannels of the channel that excludes the set of subchannels and the second set of sub channels; and
   selecting the at least one subchannel from the third set of subchannels.

7. The method of claim 6, wherein the at least one subchannel is selected randomly from the third set of subchannels.

8. The method of claim 4, further comprising:
   determining a second set of subchannels and the signal strength for each subchannel in the second set of sub channels based on information reported in the received D2D broadcasts;
   determining a first subset of subchannels of the set of subchannels with a corresponding signal strength less than a first threshold;
   determining a second subset of subchannels of the second set of subchannels with a corresponding signal strength less than a second threshold; and
   selecting the at least one subchannel from the first subset of subchannels and the second subset of sub channels.

9. The method of claim 8, wherein the at least one subchannel is selected randomly from the determined first and second subsets of subchannels.

10. The method of claim 2, wherein the broadcast in the at least one subchannel is concurrent in time with other broadcasts in the channel that comprise control information, and the broadcast in the at least one subchannel includes one or more resource blocks within n consecutive subframes of a set of frames.

11. The method of claim 10, wherein n is equal to one.

12. The method of claim 10, wherein n is greater than or equal to two.

13. The method of claim 2, wherein the broadcasts comprising control information have a lower modulation and coding scheme (MCS) than broadcasts comprising data traffic.

14. An apparatus for wireless communication, comprising:
   means for receiving one or more device-to-device (D2D) broadcasts in a set of subchannels of a channel; and
   means for broadcasting in at least one subchannel of the channel information indicating a subset of the set of subchannels on which the one or more D2D broadcasts are received and a respective signal strength associated with each subchannel in the subset of the set of subchannels.

15. The apparatus of claim 14, wherein the one or more D2D broadcasts include a first set of broadcasts that comprises control information and a second set of broadcasts that comprises data traffic, wherein the broadcasted information is control information.

16. The apparatus of claim 14, wherein the subset of the set of subchannels includes all of the subchannels in the set of subchannels.

17. The apparatus of claim 14, further comprising means for determining the respective signal strength of each of the one or more D2D broadcasts received in the set of subchannels.

18. The apparatus of claim 17, further comprising:
means for determining a maximum number $N_{max}$ of subchannels to report; and
means for ranking each subchannel in the set of subchannels by the determined signal strength,
wherein the subset of the set of subchannels includes a top N ranked subchannels, N being less than or equal to the maximum number $N_{max}$.

19. The apparatus of claim 17, further comprising:
means for determining a second set of subchannels and the signal strength for each subchannel in the second set of subchannels based on information reported in the received D2D broadcasts;
means for determining a third set of subchannels of the channel that excludes the set of subchannels and the second set of subchannels; and
means for selecting the at least one subchannel from the third set of subchannels.

20. The apparatus of claim 17, further comprising:
means for determining a second set of subchannels and the signal strength for each subchannel in the second set of subchannels based on information reported in the received D2D broadcasts;
means for determining a first subset of subchannels of the set of subchannels with a corresponding signal strength less than a first threshold;
means for determining a second subset of subchannels of the second set of subchannels with a corresponding signal strength less than a second threshold; and
means for selecting the at least one subchannel from the first subset of subchannels and the second subset of subchannels.

21. The apparatus of claim 15, wherein the broadcast in the at least one subchannel is concurrent in time with other broadcasts in the channel that comprise control information, and the broadcast in the at least one subchannel includes one or more resource blocks within n consecutive subframes of a set of frames.

22. An apparatus for wireless communication, comprising:
a memory; and
at least one processor coupled to the memory and configured to:
receive one or more device-to-device (D2D) broadcasts in a set of subchannels of a channel; and
broadcast in at least one subchannel of the channel information indicating a subset of the set of subchannels on which the one or more D2D broadcasts are received and a respective signal strength associated with each subchannel in the subset of the set of subchannels.

23. The apparatus of claim 22, wherein the one or more D2D broadcasts include a first set of broadcasts that comprises control information and a second set of broadcasts that comprises data traffic, wherein the broadcasted information is control information.

24. The apparatus of claim 22, wherein the subset of the set of subchannels includes all of the subchannels in the set of subchannels.

25. The apparatus of claim 22, wherein the at least one processor is further configured to determine the respective signal strength of each of the one or more D2D broadcasts received in the set of subchannels.

26. The apparatus of claim 25, wherein the at least one processor is further configured to:
determine a maximum number $N_{max}$ of subchannels to report; and
rank each subchannel in the set of subchannels by the determined signal strength,
wherein the subset of the set of subchannels includes a top N ranked subchannels, N being less than or equal to the maximum number $N_{max}$.

27. The apparatus of claim 25, wherein the at least one processor is further configured to:
determine a second set of subchannels and the signal strength for each subchannel in the second set of subchannels based on information reported in the received D2D broadcasts;
determine a third set of subchannels of the channel that excludes the set of subchannels and the second set of sub channels; and
select the at least one subchannel from the third set of subchannels.

28. The apparatus of claim 25, wherein the at least one processor is further configured to:
determine a second set of subchannels and the signal strength for each subchannel in the second set of subchannels based on information reported in the received D2D broadcasts;
determine a first subset of subchannels of the set of subchannels with a corresponding signal strength less than a first threshold;
determine a second subset of subchannels of the second set of subchannels with a corresponding signal strength less than a second threshold; and
select the at least one subchannel from the first subset of subchannels and the second subset of sub channels.

29. The apparatus of claim 23, wherein the broadcast in the at least one subchannel is concurrent in time with other broadcasts in the channel that comprise control information, and the broadcast in the at least one subchannel includes one or more resource blocks within n consecutive subframes of a set of frames.

30. A non-transitory computer-readable medium storing computer-executable code, comprising code to:
receive one or more device-to-device (D2D) broadcasts in a set of subchannels of a channel; and
broadcast in at least one subchannel of the channel information indicating a subset of the set of subchannels on which the one or more D2D broadcasts are received and a respective signal strength associated with each subchannel in the subset of the set of subchannels.

* * * * *